(12) United States Patent
Rasmussen et al.

(10) Patent No.: US 9,217,559 B2
(45) Date of Patent: Dec. 22, 2015

(54) MOVING HEAD LIGHT FIXTURE WITH YOKE AND HEAD POSITION ENCODING MEANS

(71) Applicant: MARTIN PROFESSIONAL A/S, Aarhus N (DK)

(72) Inventors: Torben Kaas Rasmussen, Aarhus N (DK); Thomas Vinter, Beder (DK)

(73) Assignee: MARTIN PROFESSIONAL A/S, Aarhus N (DK)

( * ) Notice: Subject to any disclaimer, the term of this patent is extended or adjusted under 35 U.S.C. 154(b) by 0 days.

(21) Appl. No.: 14/362,457

(22) PCT Filed: Mar. 15, 2013

(86) PCT No.: PCT/DK2013/050069
§ 371 (c)(1),
(2) Date: Jun. 3, 2014

(87) PCT Pub. No.: WO2013/139338
PCT Pub. Date: Sep. 26, 2013

(65) Prior Publication Data
US 2015/0003099 A1    Jan. 1, 2015

(30) Foreign Application Priority Data

Mar. 20, 2012 (DK) .................. 2012 70123

(51) Int. Cl.
*F21V 21/15* (2006.01)
*F21V 23/04* (2006.01)
(Continued)

(52) U.S. Cl.
CPC ......... *F21V 23/0492* (2013.01); *F21S 48/1742* (2013.01); *F21V 21/15* (2013.01); *F21V 23/0442* (2013.01); *F21S 10/00* (2013.01); *F21W 2131/406* (2013.01)

(58) Field of Classification Search
CPC ..... F21V 21/15; F21V 23/0492; F21V 21/14; F21V 21/30; F21V 21/28; F21V 21/145; F21V 14/00; F21V 14/02; F21V 14/025; F21V 23/0442; F21V 19/02; F21V 17/02; F21V 17/04; F21V 17/06; F21W 2131/406; F21S 48/1742; F21S 10/00
See application file for complete search history.

(56) References Cited

U.S. PATENT DOCUMENTS 6,241,366 B1 * 6/2001 Roman et al. ................. 362/293
8,449,141 B1 * 5/2013 Hinrichs ....................... 362/235
(Continued)

FOREIGN PATENT DOCUMENTS

EP          2103864 A1    9/2009
WO     2006/024812 A1    3/2006
WO     2011100973 A1    8/2011

OTHER PUBLICATIONS

International Search Report for PCT/DK2012/050069, Jun. 12, 2013.
(Continued)

*Primary Examiner* — Bao Q Truong
(74) *Attorney, Agent, or Firm* — Artegis Law Group, LLP

(57) ABSTRACT

The present invention relates to a moving head light fixture comprising: a base; a yoke rotatable connected to the base; a head rotatable connected to the yoke. The head comprises at least one light source generating light. An actuator is adapted to rotate the yoke or the head. Magnetic means is attached to the axel of the actuator and generated a magnetic field, which is perpendicular to the actuator axel. A magnetic encoder is fixed in relation to the axel and provides at an axel position signal based the magnetic field is indicative of the angular position of the axel in relation to the magnetic encoder. Indication means provides an indication signal when the yoke or head is positioned at a number of predetermined angular positions in relation. Processing means are adapted to control the moving head light fixture based on the actuator axel position signal and the indication signal.

10 Claims, 7 Drawing Sheets

(51) Int. Cl.
*F21S 8/10* (2006.01)
*F21S 10/00* (2006.01)
*F21W 131/406* (2006.01)

(56) References Cited

U.S. PATENT DOCUMENTS 8,727,570 B2 * 5/2014 Dalsgaard .................. 362/249.1

2003/0137842 A1 7/2003 Chang
2008/0186720 A1 * 8/2008 Verbrugh ...................... 362/383
2013/0155672 A1 * 6/2013 Vo et al. ......................... 362/233

OTHER PUBLICATIONS

Danish Search Report for PA 2012 70123, Oct. 31, 2012.

* cited by examiner

MOVING HEAD LIGHT FIXTURE WITH YOKE AND HEAD POSITION ENCODING MEANS

FIELD OF THE INVENTION

The present invention relates to an illumination device comprising a base, a yoke connected to and rotatable relatively to the base and a head connected to and rotatable relatively to the yoke. The head comprises at least one light source generating light and the moving head light fixture comprises means for detecting the position of the yoke in relation to the base and/or means for detecting the position of the head in relation to the yoke.

BACKGROUND OF THE INVENTION

Moving head lighting fixtures are commonly known in the art of lighting and especially in connection with entertainment lighting. Typically a moving head light fixture comprises a head having a number of light sources which creates a light beam and number of light effect means adapted to create various light effects. The head is rotatable connected to a yoke and the yoke is rotatable connected to a base and the result is that the head can be paned and tilted whereby the light beam can be directed in many directions. Typically moving head light fixtures allows an angular position of the yoke in relation to the base between 0-540 degrees, meaning that the yoke can be rotated 1½ revolution in relation to the base. Similar, typical moving head light fixture allows the head an angular position of the head in relation to the yoke between 0-270 degrees. However some moving head light fixtures allows larger or smaller ranges of angular displacement of the yoke or head.

As a consequence most moving head light fixtures are provided with means for registering the position of the yoke in relation to base and the position of the head in relation to the yoke. Traditionally this have been carried out by resetting the yoke and head position at startup by rotating the head and yoke to the end stop position and there're after adapt the processor of the moving head to count the number of steps which the step motors have turned in relation to the end stop position. However there are risks that step motors loses steps during operation which results in the fact that the counting becomes inaccurate. This has been solved by providing optical sensors adapted to count rotation steps of the axis of rotation instead of counting the steps applied by the step motors.

For instance U.S. Pat. No. 4,716,344 discloses a motorized lamp directing device where the lamp housing is rotatable mounted in a U-shaped braked and can be rotated by a motor assembly. The motor assembly include a box-like enclosure having four mutually perpendicular side walls extending downwardly from a top plate, where a DC motor and its gear box are mounted on the top plate. An input shaft extends into the interior and cooperates with an endless belt entrained about a larger diameter pulley secured to a driven shaft. The drive shaft is connected to and rotates the lamp in relation to the U-shaped bracket. The relative diameters of the input shaft and the pulley of are 18:120. Secured to the end of the input shaft is an encoder wheel having a pattern of sensible indicia inscribed thereon and capable of being sensed by an optical sensor.

In is known that the optical sensors may be disturbed by smoke or dust and there are thus are a risk of losing counts, whereby the determined position is in correct.

US2003/0137842 discloses a reflective mechanism for a stage lamp providing an incident light. The reflective mechanism includes a mounting device, a rotary device, a rotary frame, a reflective device rotatably mounted to the rotary frame, and a transmission device. The rotary device is mounted to the mounting device and comprises a fixed outer ring, a middle ring concentrically, rotatably mounted in the fixed outer ring, and an inner ring concentrically, rotatably mounted in the middle ring. The inner ring and the middle ring are driven by a first power device and a second power device, respectively. The rotary frame is attached to the middle ring to turn therewith. The transmission device includes a first transmission member mounted to the inner ring to turn therewith and a second transmission member that is mounted to the reflective device to turn therewith and that is connected to the first transmission member. A light source generating a light beam is provided in the mounting device, the light beam is passing through the outer, middle and inner ring and hits the reflection device and is thereby reflected in a desired direction as the reflection device can be rotated and tilted.

A magnetic element is mounted to a side of the middle ring, and another magnetic element is mounted to a side of the inner ring. Each magnetic element is detected by an associated sensor, which thereby detect the position of the middle ring and inner ring in relation to the mounting device, thereby providing a zeroing function at the beginning of starting of the power devices. The magnetics elements acts as a reset mechanism and makes it only possible to detect the position of the reflective device it is arranged at a certain position in relation the mounting devices and it is thus not possible to detect the present position of the refection device. Further it is not possible to detect the angular position of the reflection device in relation to mounting device and it is thus not possible to differentiate between different resolutions of the refection device.

EP 2 103 864 and EP 2 103 865 (corresponds to US 2009/0231852 and U.S. Pat. No. 7,654,692) disclose as moving head light fixture comprising at least one absolute encoding device. The absolute encoding device indicates the angular movement of a first input axel in relation to the encoding device and comprises a gearbox. The gear box comprises the first input axel, a first toothed timing wheel driven by the first input axel, a second toothed timing wheel intermeshing the first toothed timing wheel and a second axel connected to and rotated by the second toothed timing wheel. The number of tooth of the first and second timing wheels is different and the first input axel and the second axel timing wheels rotates thus at different angular velocity. Magnets generate a magnetic field mostly perpendicular to the longitudinal direction of the axles and are arranged at the ends of the first input axel and the second input axel. The magnets face a magnetic encoding device capable of measuring the direction the magnetic field whereby the angular position of the axel can be determined The first input axel of the absolute encoding device is driven by a belt. The belt is further interconnecting the rotation axis of the head of a moving head light fixture and a motor, where the motor is adapted to drive the belt, which then rotates the head. The first input axel of the absolute encoding device is rotated as the belt rotates and the angular position of the first input axel and the second axel in relation to each other changes when the belt is driven. The internal processor uses the magnets and magnetic encoders to sense the position of the first input axel and the second axel in relation to each other and can based on these measurements determine the absolute position of the head. This set up makes it possible to immediately to determine the position of the head when the moving head is turned on and the measurement it further not disturbed by dust and smoke. However the absolute encoding device must be very accurately calibrated in connection with the manufacturing process as the internal processes need to know the correlation between the different angular positions of the first input axel and the second axel of the absolute encoding device and the actual position of the head. Such process makes the manufacturing process more complicated and expensive. Further there is a risk that a person may move the belt and first axes in relation to each other during service inside the moving head light fixture and as a consequence the factory calibration of the moving head is destroyed.

Further the absolute encoding device is rather expensive to manufacture as it comprises many parts and needs to be provided separately. Further the magnetic encoders are relatively expensive and a moving head where such absolute encoding device have been used to determine yoke position in relation to base and head position in relation the yoke need at least four of such magnetic encoders.

The competition in the market has traditionally been based on the optical performance of the moving head such as light output, number of light effects, color mixing etc. The competition in the market has lately changed such that parameters such as quality, serviceability and price have become the most important factors. There is thus a need for a competitive moving head lighting fixture with regard to quality, serviceability and price. The prior art moving heads comprise many components and are thus rather complicated to manufacture which increases the price of the moving head and further complicates the serviceability of the moving head.

DESCRIPTION OF THE INVENTION

The object of the present invention is to solve the above-described limitations related to prior art. This is achieved by a moving head light fixture as described in the independent claims. The dependent claims describe possible embodiments of the present invention. The advantages and benefits of the present invention are described in the detailed description of the invention.

DETAILED DESCRIPTION OF THE INVENTION

The present invention is described in view of a moving head lighting fixture including a light source generating a light beam, however the person skilled in the art realizes that the present invention can be used in any kind of illumination devices having at least two housings which are rotatable in relation to each other. Further it is to be understood that any kind of light source such as discharge lamps, OLEDs, LED, plasma sources, halogen sources, fluorescent light sources, etc. can be used.

Figure 1:
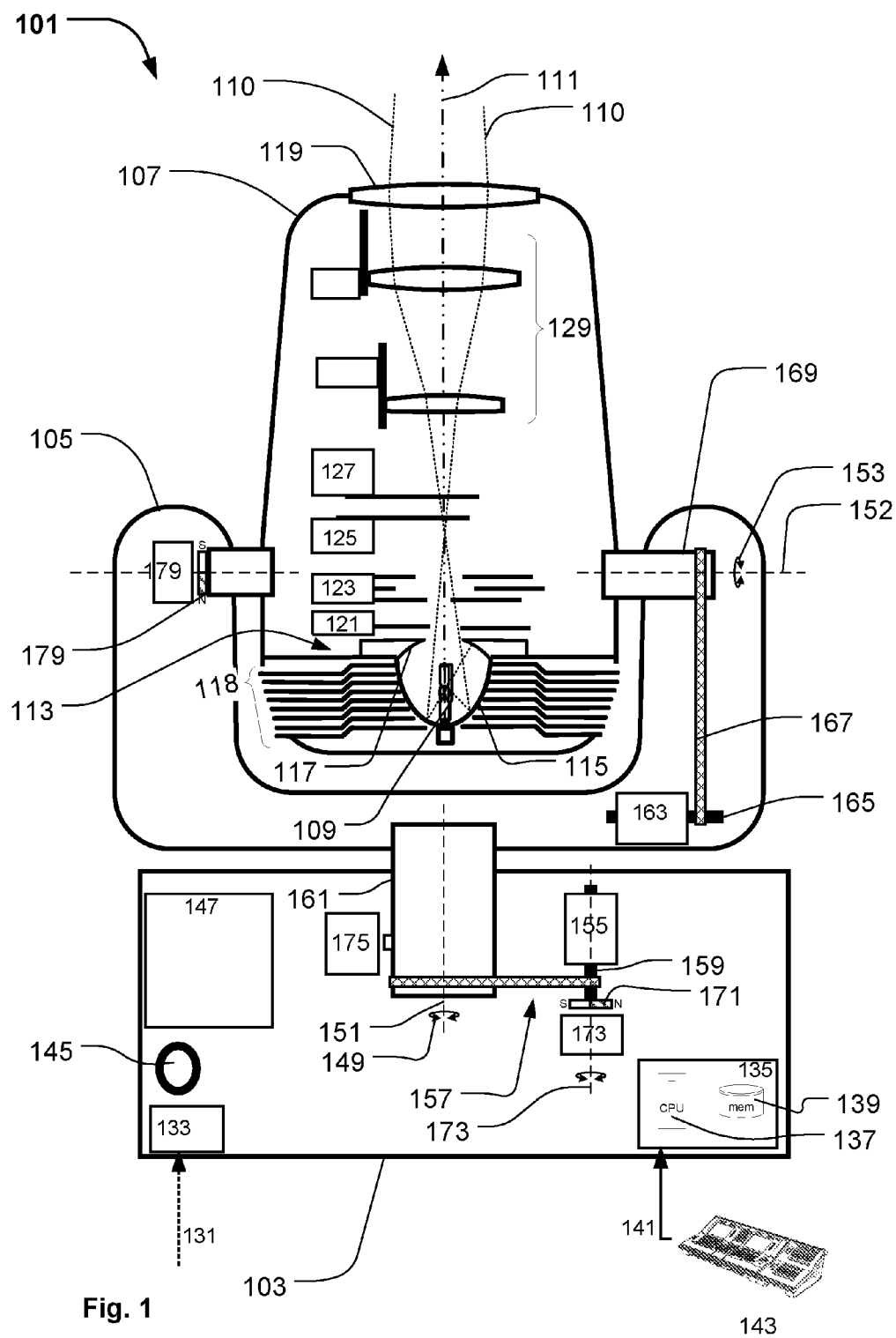
FIG. 1 illustrates a structural diagram of a moving head light fixture comprising a position encoding device according to the present invention.

FIG. 1 is a structural diagram illustrating a moving head light fixture 101 comprising a position encoding system according to the present invention. The moving head light fixture 101 comprises a base 103 rotatable connected to a yoke 105 and a head 107 rotatable carried in the yoke. The head comprises at least one light source 109 which generates a light beam 110 propagating along an optical axis 111.

In this embodiment the light source 109 is arranged in a lamp reflector and cooling system 113 comprising a main reflector 115 wherein the light source 109 is arranged, a retro reflector 117 arranged outside off and facing the main reflector. The reflector and cooling system comprises also a number of cooling fins 118 adapted to dissipate heat from the light source and a number of blowers (not shown) are adapted to blow air through openings between the cooling fins. The light is directed along the optical axis 111 by the reflector system and passes through a number of light effects before exiting the head through a front lens 119. The light effects can for instance be any light effects known in the art of lighting systems for instance a dimmer 121, a CMY color mixing system 123, color filters (not shown), gobos 125, animation effects 127, focus and zoom system 129, prism effects (not shown), framing effects (not shown), iris effects (not shown) or any other light effects known in the art of entertainment lighting. It is noted that more, fewer or no light effects may be comprised in the moving head and that any number and types of light sources can be used.

The moving head light fixture receives electrical power 131 from an external power supply (not shown). The electrical power is received by an internal power supply 133 which adapts and distributes electrical power through internal power lines (not shown) to the subsystems of the moving head and can be constructed in many different ways. The light fixture comprises also a controller 135 typically comprising processing means 137 and memory means 139. The controller controls the other components (other subsystems) in the light fixture based on an input signal 141 indicative light effect parameters, position parameters and other parameters related to the moving head lighting fixture. The controller receives the input signal from a light controller 143 as known in the art of intelligent and entertainment lighting for instance by using a standard protocol like DMX, ArtNET, RDM etc, however any other communication protocol suitable for communication control commands can also be used. Typically the light effect parameter is indicative of at least one light effect parameter related to the different light effects in the light system. The central controller is adapted to send commands and instructions to the different subsystems of the moving head through internal communication lines (not shown). The internal communication system can be based on a various type of communications networks/systems.

The moving head light fixture can also have user input means enabling a user to interact directly with the moving head light fixture instead of using a light controller 143 to communicate with the moving head light fixture. The user input means 145 can for instance be bottoms, joysticks, touch pads, keyboard, mouse etc. The user input means can also be supported by a display 147 enabling the user to interact with the moving head light system through a menu system shown on the display and by using the user input means 145. The display device and user input means can in one embodiment also be integrated as a touch screen.

The moving head light fixture comprises rotating means adapted to rotate at least at the yoke 105 in relation to the base 103 or the head 107 in relation to the yoke 105. As indicated by arrow 149 the yoke can rotate both ways around a yoke axis 151 and the head can rotate both ways around a head axis 152 as illustrated by arrow 153.

In the illustrated embodiment the rotating means comprises a yoke actuator 155 adapted to rotate the yoke 105 around the yoke axis 149 and in relation to the base 103 through a mechanical yoke drive mechanism 157. The yoke actuator comprises and drives a yoke actuator axel 159. The yoke actuator axel 159 interacts with the mechanical yoke drive mechanism 157, which is connected to a yoke shaft 161. The yoke shaft 161 is rotatable connected to the base through a bearing (not shown) and fixed in relation the yoke whereby the yoke can rotate around the yoke axis and in relation to the base.

In a similar way the rotating means comprises a head actuator 163 comprising and driving a head actuator axel 165. The head actuator axel interacts with the mechanical head drive mechanism 167, which is connected to a head shaft 169. The head shaft is rotatable connected to the yoke through a bearing (not shown) and fixed in relation the head whereby the head can rotate around the head axis 152 and in relation to the yoke. In the illustrated embodiment the head comprises two head shafts, which are rotatable, connected to the two upstanding legs of the yoke and the head actuator and head drive mechanism interacts with one of the head shafts.

The skilled person realizes the mechanical yoke and head drive mechanism can be constructed in many different ways using mechanical components such as, shafts, gears, cables, chains, belts, transmission systems, bearings etc. However as an example the yoke and yoke drive mechanism comprises a belt which interacts with a toothed yoke axel wheel and a toothed yoke shaft wheel. Similar the head drive mechanism 167 comprises a belt which interacts with a toothed head axel wheel and a toothed head shaft wheel.

Further the moving head light fixture comprises position sensing means providing at least one position signal (not shown) indicative of at least the position of the yoke in relation to the base and/or the position of the head in relation to the yoke. The controller is adapted to control the rotating means based on the at least one position signal and the input signal, where the input signal is indicative of at least one position parameter. The controller can hereby position the head, yoke and base in any position allowable by the mechanics. The position signal is fed from the position sensing means to the controller 135 and can be any signal (analog and digital) indicative of the position of the yoke and/or the head and which can be read by the controller 135.

In this embodiment the position sensing means comprises magnetic means 171. The magnetic means 171 is attached to the yoke actuator axel 159 and rotates simultaneously with the yoke actuator axel. The magnetic means 159 generates a magnetic field, which is substantially perpendicular to the axis of rotation 173 of the yoke actuator axel whereto the magnetic means is attached. The magnetic means can for instance be a permanent magnet of a magnetic material generating a magnetic field, however if desired it can also be embodied as electro magnets. A magnetic encoder 173 is fixed in relation to the axel 159 whereto the magnetic means 159 is attached and provides at least one axel position signal, where the axel position signal is indicative of the angular position the axel in relation the magnetic encoder. The magnetic encoder is any device capable of measuring the direction of the magnetic field generated the magnetic means and this signal is thus indicative of the angular position of the yoke axel 159. The magnetic encoder can for instance be an AS5040 Rotary encoder provided by the company Australian Microsystems and any of the magnetic rotary encoders listed at the webpage: http://www.austriamicrosystems.com/Products/Magnetic-Encoders. However it is noted that similar magnetic encoders from different suppliers can be used.

In addition to the magnetic means 171 and the corresponding magnetic encoder 173 indication means 175 providing an indication signal when the yoke is positioned at a predetermined position in relation to the base have also been provided. The indication means can be embodied as a mechanical or optical switch which is activated by mechanical means attached to the yoke or yoke shaft. In the illustrated embodiment the indication means is embodied as a magnetic switch 175 which provides the indication signal when a magnetic field is detected by the magnetic switch. Magnetic means is thus provided at the yoke and passes near the magnetic switch. In the illustrated embodiment the magnetic means are provided as a permanent magnet arranged at the yoke shaft and will thus activate the magnetic switch one time pr. revolution. This ensures a very reliable switch which in not sensitive to smoke or dust. The magnetic means 177 are positioned offset the yoke axis and ensures that wires can be lead through the yoke shaft and that the yoke shaft can be rotated more than 360 degrees without braking or tangling the wires.

The yoke can rotate more than 360 degrees around the yoke axis 151 meaning that the yoke can perform more than one revolution in relation to the base. Typically moving heads is designed such that the yoke can rotate 480-720 degrees in relation to the base. The indication means 175 will thus provide an indication signal every time the yoke have experience one revolution in relation to the base. The mechanical yoke drive mechanism 157 have be designed such that the angular position of the magnetic means 171 in relation the magnetic encoder 173 is different for each revolution of the yoke in relation to the base. This can be achieved by designing in the gearing between the yoke actuator axel and the yoke shaft for instance by designing and adapting number of tooth of the toothed yoke axel wheel and toothed yoke shaft wheels such the angular position of the magnetic means 171 in relation the magnetic encoder 173 is different every time the indication means is activated. In other words the gear ratio of the yoke actuator axel and the yoke shaft is designed such that the angular position of the yoke shaft is coupled to a predetermined the angular position of the magnetic means 171 in relation the magnetic encoder 173 when the indication means is activated. The angular position the yoke defines the angle of the yoke shaft in relation to a predefined starting point when the yoke have been rotated in relation to the predefined starting point. Typically the yoke can be rotated 720 degrees in relation to the base and the predefined starting point can be defined as one of the outermost positions of the yoke in relation to the base. The angular position of 0 degrees corresponds thus to the outermost position of the yoke; The angular position of 180 degrees correspond to ½ revolution, 360 degrees corresponds to a full revolution, 540 degrees correspond to 1½ revolutions and 720 corresponds to 2 revolutions.

Each time the indication means is activated the angular position of the yoke activated is linked to an angular position of the magnetic means 171 in relation the magnetic encoder 173. Each combination of indication signal and yoke actuator position signal corresponds thus to a unique angular position of the yoke and the indication signal and position signal can thus be used to determine the angular position of the yoke. Hereafter the processing means can determine the angular position of the yoke based on at the yoke actuator position signal and knowledge about the gear ratio for instance as a formula or lookup table stored in the memory.

This makes it possible to provide a cheap and reliable position encoder system where the controller can determine the position of the yoke in relation to the base and then adapt the position of the yoke according to the input signal.

This is achieved, as when the indication means is activated, the controller receives the indication signal and reads the position signal from the magnetic encoder and uses these signals to determine the angular position of the yoke in relation to the base. Thereafter the controlling means can determined the angular position of the yoke in relation to the base based on the magnetic encoders, which is indicative of a the angular displacement of the yoke actuator axel. The controller can based on knowledge of the related drive mechanism determined the actual angular potion of the yoke, and then control the moving head light fixture based on determined position. Compared to the stage lamp of US 2003/0137842 this makes it possible to determine the revolution number of the yoke in relation the base and at the same time determine intermediate positions during the revolution. This is possible as the indication signal provided by the indication means are combined with the yoke actuator position signal, which enable accurate calibration and the yoke actuator position signal can hereafter be used to determine the yoke position in relation to the base at intermediate positions.

In contrast to the prior art position encoding system disclosed by 2 103 864 and EP 2 103 865 (corresponds to US 2009/0231852 and U.S. Pat. No. 7,654,692) this system only requires one magnetic encoder, however the position can be calibrated very fast as the indication means can be position at strategically positions such that the yoke does not need to be rotate all the way to the outermost end position. Also the encoding mechanism does not need to be in contact with the driving belt, which eliminates calibration errors due to the driving belt and further makes is easier to replace a broken driving belt. It is also possible to provide a number of indication means indicative of different yoke positions and thereby reduce the calibration time as the position of the yoke now can be calibrated at multiple positions.

Although not the case with the illustrated moving head, it is to be understood that a similar system can be used to determine the position of the head in relation to the yoke. The skilled person will realize that this require magnetic means generating a magnetic field substantially perpendicular to the head actuator axel and a magnetic encoder determine the angular displacement of the head actuator axel based on the magnetic field and that indication means need to be provide at the head or head shaft.

However, typically the head of moving head light fixtures can rotate less than 360 degrees around the head axis and in relation to the yoke. In such embodiments the position sensing means comprises magnetic means 179 attached to the head shaft and which rotates simultaneously with the head shaft. The magnetic means 179 generates a magnetic field which is substantially perpendicular to the axis of rotation 173 of the head shaft whereto the magnetic means is attached. The magnetic means can for instance be a permanent magnet of a magnetic material generating a magnetic field, however if desired it can also be embodied as electro magnets. A magnetic encoder 181 is fixed in relation to the head axel 169 whereto the magnetic means 179 is attached and provides at least one head shaft position signal. The magnetic encoder is any device capable of measuring the direction of the magnetic field generated the magnetic means and this signal is thus indicative of the angular position of the head axel 152. The magnetic encoder can for instance be AS5040 Rotary encoder provided by the company Australian Microsystems and any of the magnetic rotary encoders listed at the webpage: http://www.austriamicrosystems.com/Products/Magnetic-Encoders. However it is noted that similar magnetic encoders from different suppliers can be used.

This makes it possible to determine the position of the head in relation to the yoke based on the head shaft signal and control the head actuator based on the head shaft signal and the input signal. Again this encoding system makes it possible to reduce the costs of the moving head light fixture, as the number of magnetic encoders has been reduced.

Figure 2:
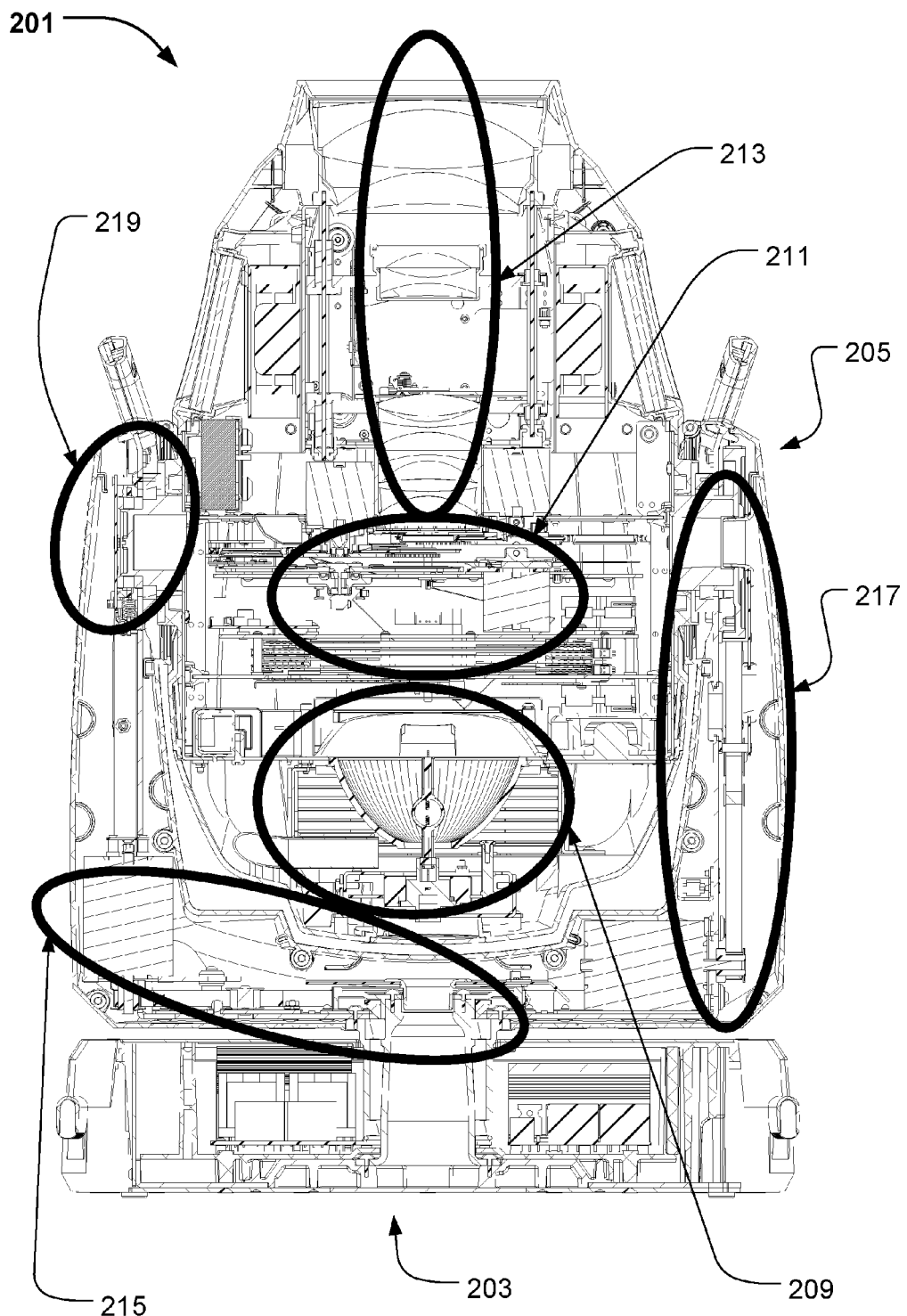
FIG. 2 illustrates a cross sectional view of another moving head light fixture comprising a position encoding device according to the present invention.

FIG. 2 illustrates a cross sectional view of another embodiment of moving head light fixture 201 comprising a position encoding system according to the present invention. The moving head light fixture comprises a base 203 rotatable connected to a yoke 205 and a head 207 rotatable carried in the yoke. The head comprises a reflecting and cooling system marked with circle 209. Circle 211 indicated a number of light effects as for instance any of those mentioned in FIG. 1. Circle 213 indicate a zoom and focus system comprising a number of optical lenses.

Circle 215 indicates a yoke rotating and yoke position encoding system according to the present invention. The yoke rotating and yoke position encoding system are based on the same principles as describe in FIG. 1, but situated in the yoke instead of in the base. The system will be illustrated and described in further detail in FIGS. 3 and 4. Circle 217 and 219 indicate respectively a head rotating system and a head position encoding system which both is embodied as described in FIG. 1.

Figure 3:
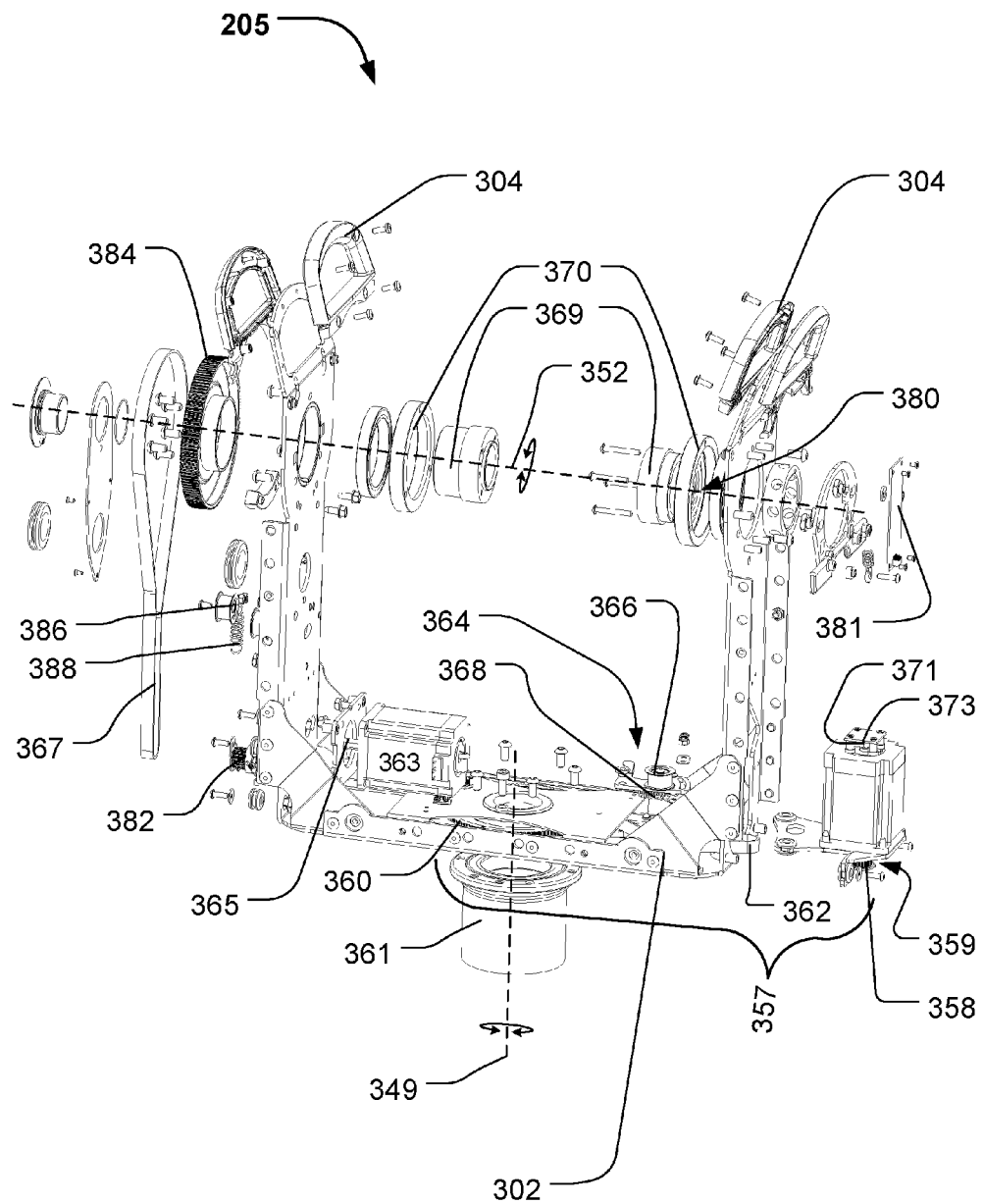
FIG. 3 illustrates an explode view of the yoke of the moving head light fixture of FIG. 2.

FIG. 3 illustrates an exploded perspective view of the yoke 205 illustrated in FIG. 2. The yoke comprises a yoke frame 302 whereon the components of the yoke are attached. The yoke frame are covered by a number of yoke shell (not shown) and provided with the handles 304, for carrying the moving head, are integrated into the upper part of the legs of the yoke frame 302.

The yoke rotating means and yoke position encoding system are mounted on the yoke frame 302 and comprises a yoke actuator 355 adapted to rotate the yoke 205 around the yoke axis 349 and in relation to the base (not shown) through a mechanical yoke drive mechanism 357 (shown in further detail in FIG. 4a-4d). The yoke actuator comprises and drives a yoke actuator axel 359. The yoke actuator axel 359 interacts with the mechanical yoke drive mechanism 357, which is connected to a yoke shaft 361. The yoke shaft 161 is rotatable connected to the base through a bearing (not shown) and fixed in relation the yoke, whereby the yoke can rotate around the yoke axis and in relation to the base.

Figure 4A:
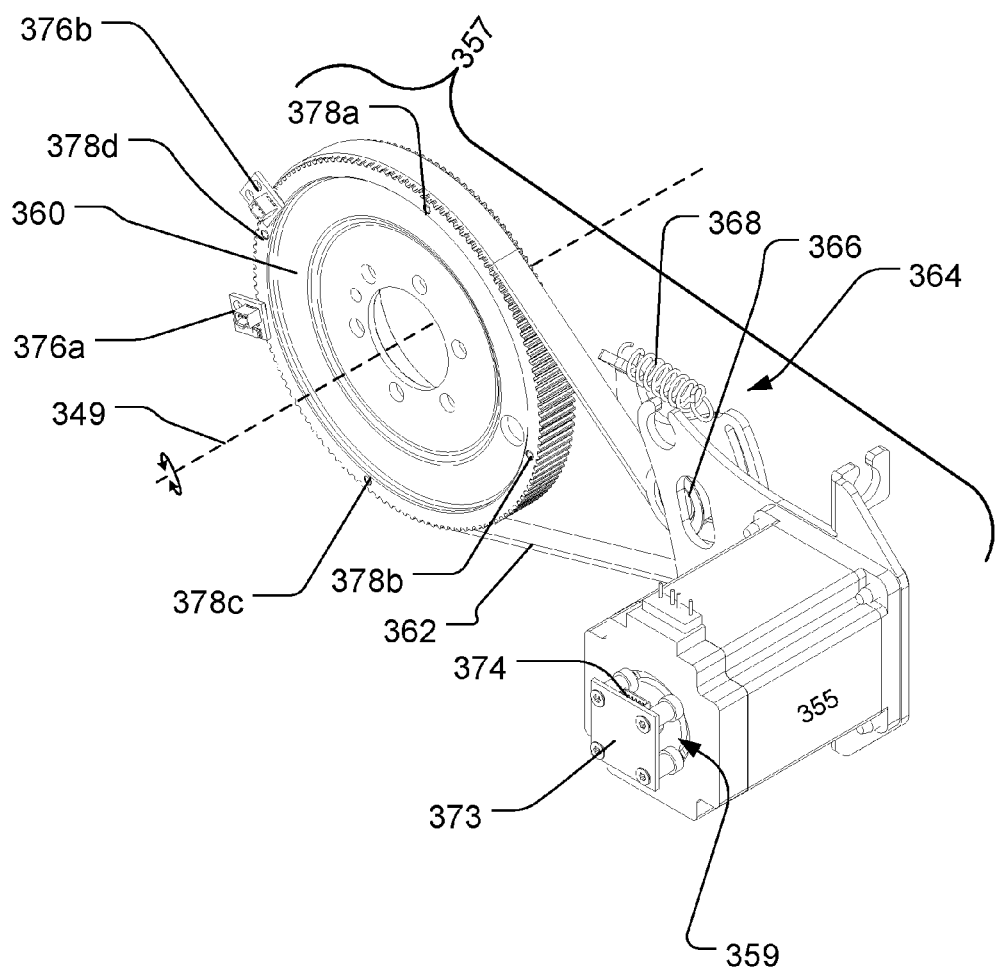
FIG. 4a-4d illustrate the yoke rotating means and yoke position encoding system of the moving head light fixture of FIG. 2.
Figure 4B:
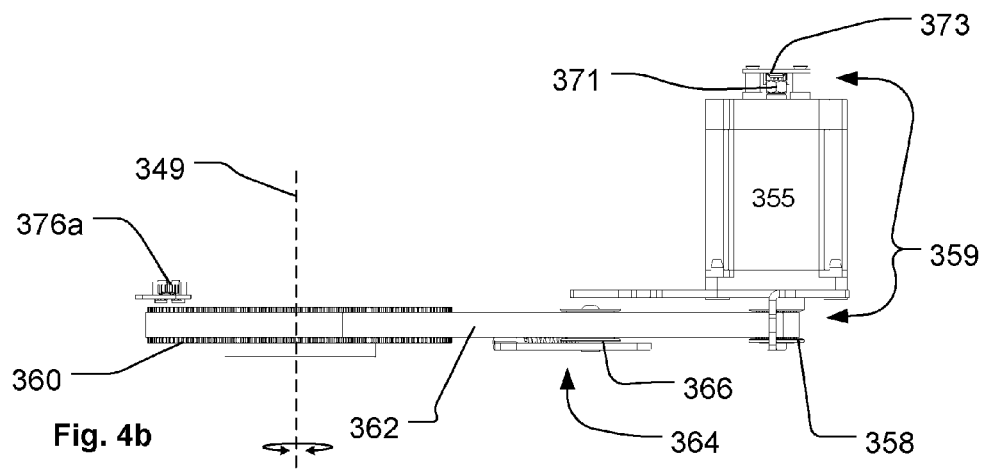
Figure 4C:
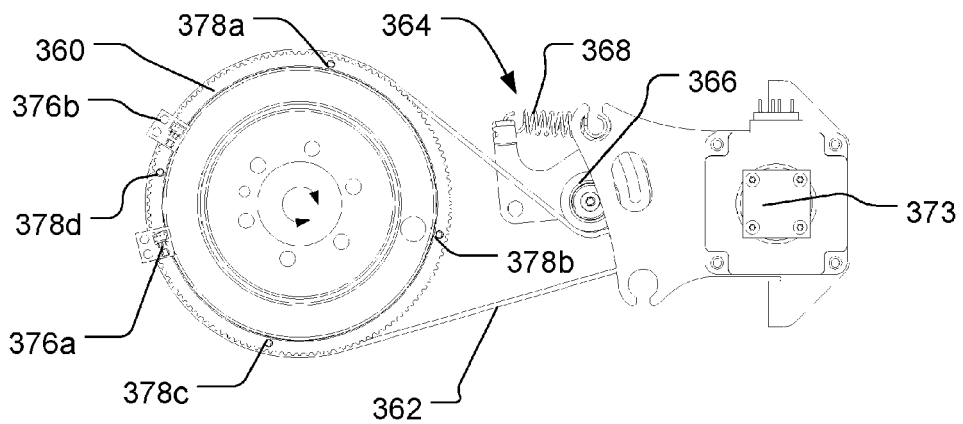
Figure 4D:
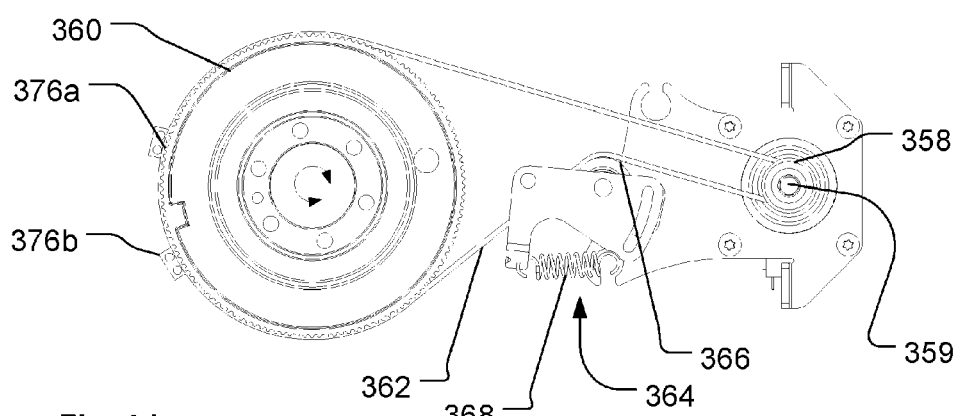

Now referring to FIG. 4a-4d illustrating the yoke rotating means and yoke position encoding system used in the moving head light fixture in FIGS. 2 and 3. FIG. 4a illustrates a perspective view, FIG. 4b illustrates a front view, FIG. 4c illustrates top view and FIG. 4d illustrates a bottom view. The yoke actuator 355 comprises and drives a yoke actuator axel 359. Components, which also are visible in FIG. 3, are also indicated in FIG. 3. The yoke actuator axel 359 interacts with the mechanical yoke drive mechanism 357, which is connected to a yoke shaft (not shown in FIG. 4a-d). In the illustrated embodiment the yoke drive mechanism comprises a toothed yoke axel wheel 358 connected to the yoke actuator axel 359 and a toothed yoke shaft wheel 360 connected to the yoke shaft (illustrated in FIG. 3). The toothed yoke axel wheel 358 and toothed yoke shaft wheel is interconnected by a yoke drive belt 362 which can be driven by the yoke actuator 355 and toothed yoke axel wheel, and thereby force the yoke to rotate around the yoke axis 349. The yoke drive belt comprises a number of teeth (not shown) matching the toothed yoke axel wheel and the toothed yoke shaft wheel. The yoke drive mechanism 357 comprises also a belt tightening mechanism 364 comprising a rotatable wheel 366 and spring means 368 adapted to apply a force to the yoke drive belt 362, whereby the yoke drive belt is kept tight.

Like in FIG. 1 the position sensing means comprises magnetic means 371 attached to the yoke actuator axel 359. In this embodiment the magnetic means is a permanent magnet which is attached at one end of the yoke axel and thus rotates simultaneously with the yoke actuator axel. The magnetic means 371 generates a magnetic field which is substantially perpendicular to the axis of rotation of the yoke actuator axel. A magnetic encoder 373 is arranged at the top of the yoke actuator and above the magnetic means 371 such that it is capable of measuring the direction of the magnetic field generated the magnetic means 371. The magnetic encoder provides a yoke axel position signal indicative of the angular position of the yoke axel and the yoke axel position signal can be sent to the controller through electrical connector 374 (FIG. 4a).

The position sensing means comprise also the indication means providing an indication signal when the yoke is positioned at a number of predetermined positions in relation to the base. In this embodiment the indication means comprises a first 376a and a second 376b magnetic switch positioned such that a number of permanent magnets can activate the magnetic switch when the permanent magnets pass near the magnetic switch. Four permanent magnets 378a-d are arranged offset the yoke axes 349 and at the toothed yoke shaft wheel 360. The four permanent magnets are arrange at 90 degrees intervals around the yoke rotating axis and the magnetic switches 376a and 376b are separated by a 45 degrees angel. The first 376a and second 376b magnetic switch will alternately provide an activation signal every time the yoke have rotated 45 degrees in relation of the base and these activation signals are sent to the controller (using connectors and wires as known in the art of electronics)

The mechanical yoke drive mechanism 357 has been designed such that the angular position of the magnetic means 371 in relation the magnetic encoder 373 is different for each revolution of the yoke in relation to the base. This can be achieved by designing in the gearing between the yoke actuator axel and the yoke shaft, for instance by designing and adapting the number of teeth of the toothed yoke axel wheel and toothed yoke shaft wheels such that the angular position of the magnetic means 371 in relation the magnetic encoder 373 is different every time the indication means is activated. In this embodiment the toothed yoke axel wheel has 18 teeth and the yoke shaft wheel has 128 teeth providing a gear ratio of 1:7.1111. This gear ratio ensures that the yoke can rotate up to 765 degrees in relation the base and the angular position of the yoke axel is different every time the first magnetic switch is activated and every time the second magnetic switch are activated. This makes it possible to identify the angular position of the yoke in relation to the base based on the activation signals from the first and second magnetic switch and the yoke axel position signal. This setup make it possible to calibrate the yoke position very fast as the yoke only need to rotate maximum of 22.5 degrees in before either the first or second magnetic switch is activated and the yoke position in relation to the base can then be calibrated. The magnetic encoder makes it hereafter possible to determine the angular position of the yoke in relative to the base at intermediate positions.

The table below illustrates the possible combinations of the first and second magnetic switch and the corresponding angular position of the yoke shaft. Some of the indicated situations are illustrated in FIG. 5a-j and the table indicates in which figure the situation is indicated.

Figure 5A:
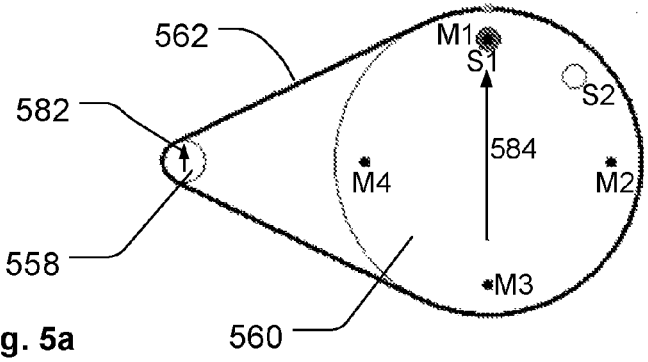
FIG. 5a-5j illustrate different situations of the encoding system of the moving head light fixture of FIG. 2
Figure 5B:
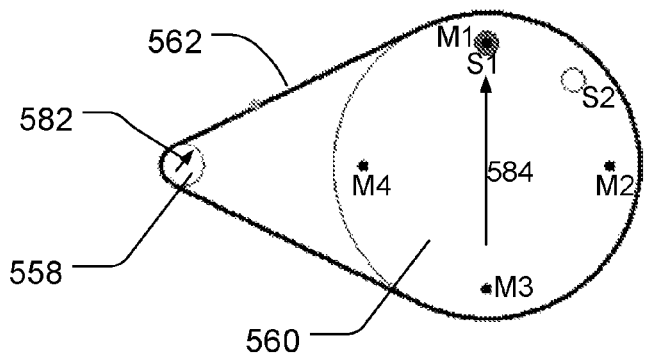
Figure 5C:
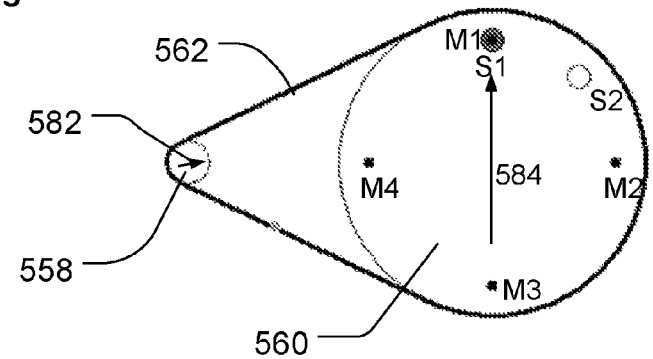
Figure 5D:
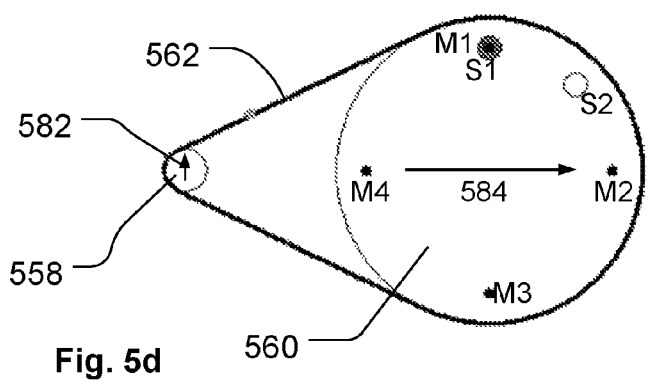
Figure 5E:
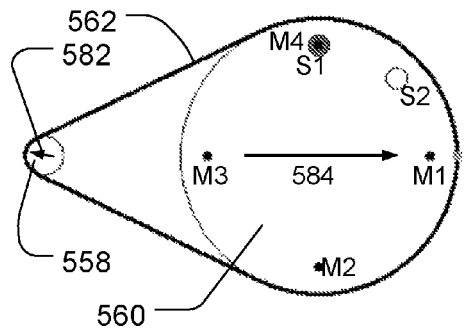
Figure 5F:
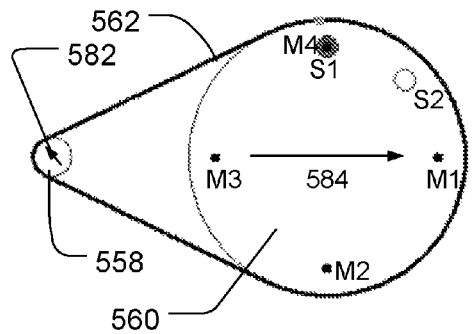
Figure 5G:
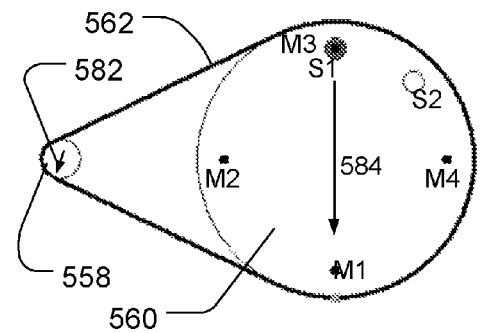
Figure 5H:
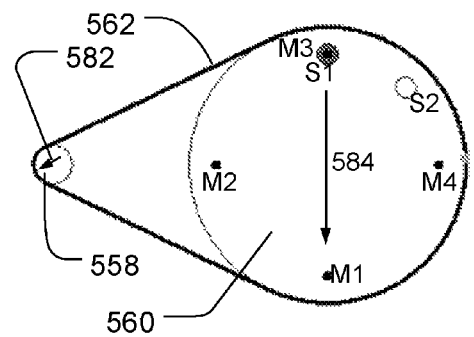
Figure 5I:
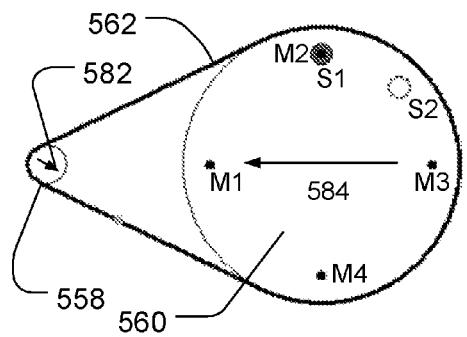
Figure 5J:
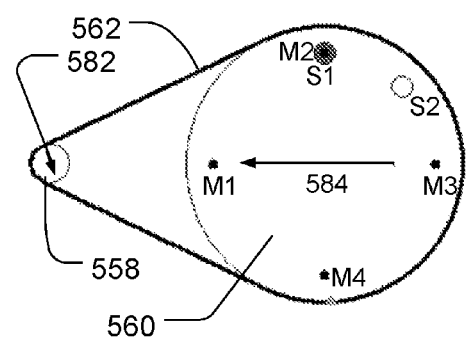

| Magnetic switch 1 | Magnetic switch 2 | Angle of yoke axel in relation to magnetic encoder | Angular position of Yoke in relation to base | Illustrated in FIG. |
|---|---|---|---|---|
| ON | OFF | 0 deg. | 0 deg. | FIG. 5a |
| OFF | ON | 320 deg. | 45 deg. | |
| ON | OFF | 280 deg. | 90 deg. | FIG. 5e |
| OFF | ON | 240 deg. | 135 deg. | |
| ON | OFF | 200 deg. | 180 deg. | FIG. 5g |
| OFF | ON | 160 deg. | 225 deg | |
| ON | OFF | 120 deg. | 270 deg. | FIG. 5i |
| OFF | ON | 80 deg. | 315 deg. | |
| ON | OFF | 40 deg. | 360 deg. | FIG. 5b |
| OFF | ON | 0 deg. | 405 deg. | |
| ON | OFF | 320 deg. | 450 deg. | FIG. 5f |
| OFF | ON | 280 deg. | 495 deg. | |
| ON | OFF | 240 deg. | 540 deg. | FIG. 5h |
| OFF | ON | 200 deg. | 585 deg. | |
| ON | OFF | 160 deg. | 630 deg. | FIG. 5j |
| OFF | ON | 120 deg. | 675 deg. | |
| ON | OFF | 80 deg. | 720 deg. | FIG. 5c |
| OFF | ON | 40 deg. | 765 deg. | |
| ~~ON~~ | ~~OFF~~ | ~~0 deg.~~ | ~~810 deg.~~ | ~~FIG. 5d~~ |

It can be seen that for every yoke angular position in the interval 0-765 degrees the angle of the yoke axel in relation to magnetic encoder is different for every time magnetic switch 1 is activated. The same applies for the magnetic switch 2. It is thus possible to determine the angular position of the yoke in relation to the base based on the indication signals (from the first and second magnetic switches) and the position signal from the magnetic encoder.

However the last value (illustrated as strike trough as this value is not possible) indicates a situation where the magnetic switch is activated and where the magnetic encoder returns 0 deg. value, which is the same parameters as the first value. However the angular position of the yoke in relation to the base is different from the two value sets which indicated that the illustrated gear ratio works in the interval 0-765 degrees if a uniquely identification of the angular position of the yoke should be provided. However for most moving head light fixtures this interval is sufficient.

Facing FIG. 5a-5j illustrating the functionality of the position encoding means. FIG. 5a-5j illustrate a model of the toothed yoke shaft wheel 560, the toothed yoke axel wheel 558 and the yoke drive belt 562. The figures illustrate the angular position of the two wheels, where the angular position of the toothed yoke shaft is illustrated by arrow 584 and the angular position of the toothed yoke axel wheel is illustrated by arrow 582. The first S1 and second magnetic switch S2 are illustrated as circles and the circle is shaded when the magnetic switch is activated. The permanent magnets at the toothed yoke shaft wheel are illustrated as small black dots M1, M2, M3, M4. All the FIGS. 5a-5j illustrate a situation where the first magnetic switch M1 is activated by one of the magnets. The magnetic switches S1 and S2 cannot detect which of the magnets M1-M4 causes the magnetic sensor to activate.

FIGS. 5a, 5b and 5c illustrate situations where the permanent magnet M1 activates magnetic switch S1 and thus show the situations where the yoke are positioned in similar angles in relation to the yoke by at different angular positions as it has rotated respectively zero, one and two revolutions in relation to the yoke. However the angular position of the yoke shaft is different for the three situations and the controller can determine the angular position of the yoke in relation the base based on the fact that the magnetic switch is activated and the value indicated by the yoke actuator axel position signal.

FIG. 5d illustrates a situation where the first magnetic switch is activated and where the angular position of the yoke axel is 0 degrees. This situation would not implementable with the gearing ratio of 18:128 as the controller would not be able to differentiate this position with the position of FIG. 5a. In general a smaller gear ratio makes it possible to allow a larger interval of angular positions of the yoke, but the person skilled in the art would realize that this would result in a slower rotation of the yoke. It is thus a matter of design options to choose the gear ratio.

FIGS. 5e and 5f illustrate two situations where the yoke has the same angle in relation to the base but are at different angular positions namely 90 degrees and 450 degrees respectively. However it can be seen that the angular positions of the yoke actuator axel are different for the two situations which makes it possible to differentiate the two positions.

FIGS. 5g and 5h illustrate two situations where the yoke has the same angle in relation to the base but are at different angular positions namely 180 degrees and 540 degrees respectively. However it can be seen that the angular positions of the yoke actuator axel are different for the two situations which makes it possible to differentiate the two positions.

FIGS. 5i and 5j illustrate two situations where the yoke has the same angle in relation to the base but are at different angular positions namely 270 degrees and 630 degrees respectively. However it can be seen that the angular positions of the yoke actuator axel are different for the two situations which makes it possible to differentiate the two positions.

The controller is adapted to read the angular position of the yoke actuator axel shaft from the magnetic encoder 372 when the first or the second magnetic switch is activated and is based on these signals adapted to determine the angular position of the yoke in relation to the base. This can be achieve by storing the table in the memory or by programming a function based on the knowledge of the gear ratio and positions of the magnets and magnetic switches.

It is noticed that in some situations the magnetic switches may be activated in a range of angular positions of the yoke due the fact that the magnetic which will sense the presents of the magnetic field generated by the permanent magnets. In such case the controller can be adapted to measure the angular position of the yoke actuator axel at the start position and at the end position and thereafter determine the angular position of the yoke in relation to the base based on an average value of the yoke actuator axel positions. For instance the magnetic encoder may detect a yoke actuator axel position of 164 degrees when the first magnetic switch starts to sense and then detect a yoke actuator axel of 236 degrees just before the first magnetics switch stops to sense the magnetic field generated by one of the permanent magnets. The average value of the two sensed yoke axel positions is (164+236)/2=200 degrees using the fact that the first magnetic sensor was activated and the calculated average angular position of the yoke axel in the table above indicate that the angular positions of the yoke is 180 degrees.

The controller can be adapted to determine the angular position of the yoke based on the yoke axel position signal from the magnetic encoder when the yoke is positioned between two magnets. In this situation the controller will be adapted to read the yoke axel position signal and then calculate an eventual change in angular position of the yoke based on knowledge of the gear ratio.

The controller can also be adapted to recalibrate the yoke position every time one of the magnetic switches is activated. This ensures that eventual step loss in motor step of the yoke actuator is recalibrated continuously.

Returning now to FIG. 3 the head rotating means comprises a head actuator 363 comprising and driving a head actuator axel 365. The head actuator axel interacts with the mechanical head drive mechanism, which is connected to a head shaft 369. In the illustrated embodiment the head is carried between the two upstanding legs of the yoke and comprises thus two head shafts. The head shafts is rotatable connected to the yoke through bearings 370 and fixed in relation to the head whereby the head can rotate around the head axis 352 and in relation to the yoke. The head actuator 363 and head drive mechanism interacts with one of the head shafts. In the illustrated embodiment the head drive mechanism comprises a toothed head axel wheel 382 connected to the head actuator axel 365 and a toothed head shaft wheel 384 connected to the head shaft 369. The toothed head axel wheel 382 and toothed head shaft wheel 384 is interconnected by a head drive belt 367 which can be driven by the head actuator 365 and the toothed head axel wheel, and thereby force the head to rotate around the head axis 352. The head drive belt comprises a number of teeth (not shown) matching the toothed head axel wheel and the toothed head shaft wheel. The head drive mechanism comprises also a belt tightening mechanism comprising a rotatable wheel 386 and spring means 388 adapted to apply a force to the head drive belt 367 whereby the head drive belt is kept tight.

Although not the case with the illustrated moving head it is to be understood that a similar system as used in connection with the yoke can be used to determine the position of the head in relation to the yoke. As the skilled person will realizes that this require magnetic means generating a magnetic field substantially perpendicular to the yoke actuator axel and a magnetic encoder determine the angular displacement of the yoke actuator axel based on the magnetic field and that indication means need to be provide at the yoke shaft.

However in the illustrated embodiment the head can rotate less than 360 degrees around the head axel, and the head position sensing means comprises magnetic means attached to the head shaft at the position illustrated by arrow 380 and which rotates simultaneously with the head shaft. The magnetic means generate a magnetic field which is substantially perpendicular to the axis of rotation 352 of the head shaft whereto the magnetic means is attached. A magnetic encoder 381 is fixed in relation to the head axel 369 whereto the magnetic means is attached and provides at least one head shaft position signal. The head shaft position signal indicates the angular position of the head shaft in relation to the yoke. The magnetic encoder is any device capable of measuring the direction of the magnetic field generated the magnetic means and this signal is this indicative of the angular position of the head shaft. The magnetic encoder can for instance be any of the magnetic rotary encoders provided by the company Australian Microsystems and for instance listed at the webpage: http://www.austriamicrosystems.com/Products/Magnetic-Encoders. However it is noted that similar magnetic encoders from different suppliers can be used.

This makes it possible to determine the position of the head based on the head shaft signal and control the head actuator based on the head shaft signal and the input signal. Again this encoding system makes it possible to reduce the costs as the number of magnetic encoders been reduced.

It is to be understood that a large number of gear ratios and setups of the magnetic switches and the permanent magnetics are possible. The setup is a matter of design options such as number of revolutions that the yoke must be able to take in relation to the base typically 450-720 degrees, as the gear ratio needs to be small when increasing the number of revolutions as more unique combinations of actuary axel angles and corresponding magnetic switch signals needs to be provided. Further a factor such as moving speed of the yoke is also subject to design options as the possible speed of movement decreases when the gear ration decreases. In overall it is a matter of design options and the skilled person will be able to embody the present invention in many different ways.

What is claimed is:

1. A moving head light fixture comprising:
   a base;
   a yoke rotatably connected to said base;
   a head rotatably connected to said yoke, said head comprises at least one light source generating light;
   at least one actuator adapted to rotate at least one of said yoke around a yoke axis and said head around a head axis;
   a position sensor providing at least one position signal indicative of at least the position of said yoke in relation to said base or the position of said head in relation to said yoke;
   a processing device adapted to control said actuator based on said at least one position signal;
   wherein said position sensor comprises:
   a magnetic element attached to an axel of said at least one actuator, said magnetic element generating a magnetic field, said magnetic field is substantially perpendicular to said axel of said at least one actuator;
   a magnetic encoder fixed in relation to said axel of said at least one actuator; said magnetic encoder provides at least one actuator axel position signal based on said magnetic field, and said at least one axel position signal is indicative of the angular position of said axel of said actuator in relation to said magnetic encoder;
   an indicator providing an indication signal when said yoke is positioned at a number of predetermined angular positions in relation to said base or when said head is positioned a number of predetermined angular positions in relation to said yoke;
   wherein said at least one position signal comprises said actuator axel position signal and said indication signal.

2. A moving head light fixture according to claim 1 further comprising a mechanical coupling mechanism adapted to couple said axel of said at least one actuator to said yoke or said head, said mechanical coupling mechanism is adapted to rotate said yoke or said head between a minimum angular position and a maximum angular position, and where said mechanical coupling mechanism being adapted to provide a number of unique angular positions of said actuator axel when said yoke or said head is positioned at said number of predetermined positions between said minimum angular position and said maximum angular position.

3. A moving head light fixture according to claim 1 wherein said positioning sensor comprises a plurality of indicators each providing an indication signal when said yoke is positioned at a number of predetermined angular positions in relation to said base or when said head is positioned at a number of predetermined angular positions in relation to said yoke.

4. A moving head light fixture according to claim 1 wherein said indicator comprises at least one magnetic means positioned at said yoke or said head and at least one magnetic switch adapted to detect said at least one magnetic means, when said magnetic means is positioned near said magnetic switch.

5. A moving head light fixture according to claim 1 wherein said processing device is adapted to determine the angular position of said yoke or said head based on said actuator axel position signal and said indication signal.

6. A moving head light fixture according to claim 1 wherein said processing device is adapted to determine the angular position of said yoke or said head based on said actuator axel position signal when said yoke or said head is positioned outside said number of predetermined positions.

7. A moving head light fixture according to claim 4 wherein said magnetic element comprise four permanent magnets positioned at 45 degrees intervals around the axes of rotation of said yoke or said head and in that two magnetic switches are provided and separated by 45 degrees in relation to said axis of rotation, said magnetic switches are adapted alternately to sense the magnetic field generate by said permanent magnets when said yoke or said head rotates around said axis of rotation.

8. A moving head light fixture according to claim 1 wherein:
   said at least one actuator is a yoke actuator adapted to rotate said yoke around said yoke axis;
   said magnetic element is attached to an axel of said yoke actuator;
   said magnetic encoder is fixed in relation to said axel of said yoke actuator and adapted to provide a yoke actuator axel position signal indicative of the angular position of said axel of said yoke actuator;
   said indicator providing an yoke indication signal when said yoke is positioned at a number of predetermined angular positions in relation to said base;
   wherein said at least one position signal comprises said yoke actuator axel position signal and said yoke indication signal.

9. A moving head light fixture according to claim 8 and further comprising a head actuator adapted to rotate said head around said head axis and said head is rotatable around said head axis at an angle less the 360 degrees in that said position sensor further comprises:
   head magnetic element attached to said head rotating and generating a head magnetic field, said head magnetic field is substantially perpendicular to said head axis;
   a head magnetic encoder fixed in relation to said head axis, said head magnetic encoder provides an head position signal indicative of the angular position of said head;
   wherein said at least one position signal comprises said head position signal.

10. A moving head light fixture comprising:
    a base;
    a yoke rotatably connected to said base;
    a head rotatably connected to said yoke, said head comprises at least one light source generating light;
    at least one actuator adapted to rotate said yoke around a yoke axis or said head around a head axis;
    a position sensor providing at least one position signal indicative of at least the position of said yoke in relation to said base or the position of said head in relation to said yoke;
    a processing device adapted to control said actuator based on said at least one position signal;
    wherein:
    said at least one actuator is a head actuator adapted to rotate said head around said head axis and said head is rotatable around said head axis at an angle less than 360 degrees;
    and wherein said position sensor comprises:
    head magnetic element attached to said head rotating and generating a head magnetic field, said head magnetic field is substantially perpendicular to said head axis;

a head magnetic encoder fixed in relation to said head axis, said head magnetic encoder provides an head position signal indicative of the angular position of said head;

wherein said at least one position signal comprises said head position signal.

* * * * *